(No Model.) 2 Sheets—Sheet 1.
W. A. HOLT.
SEED PLANTER AND FERTILIZER DISTRIBUTER.
No. 405,477. Patented June 18, 1889.
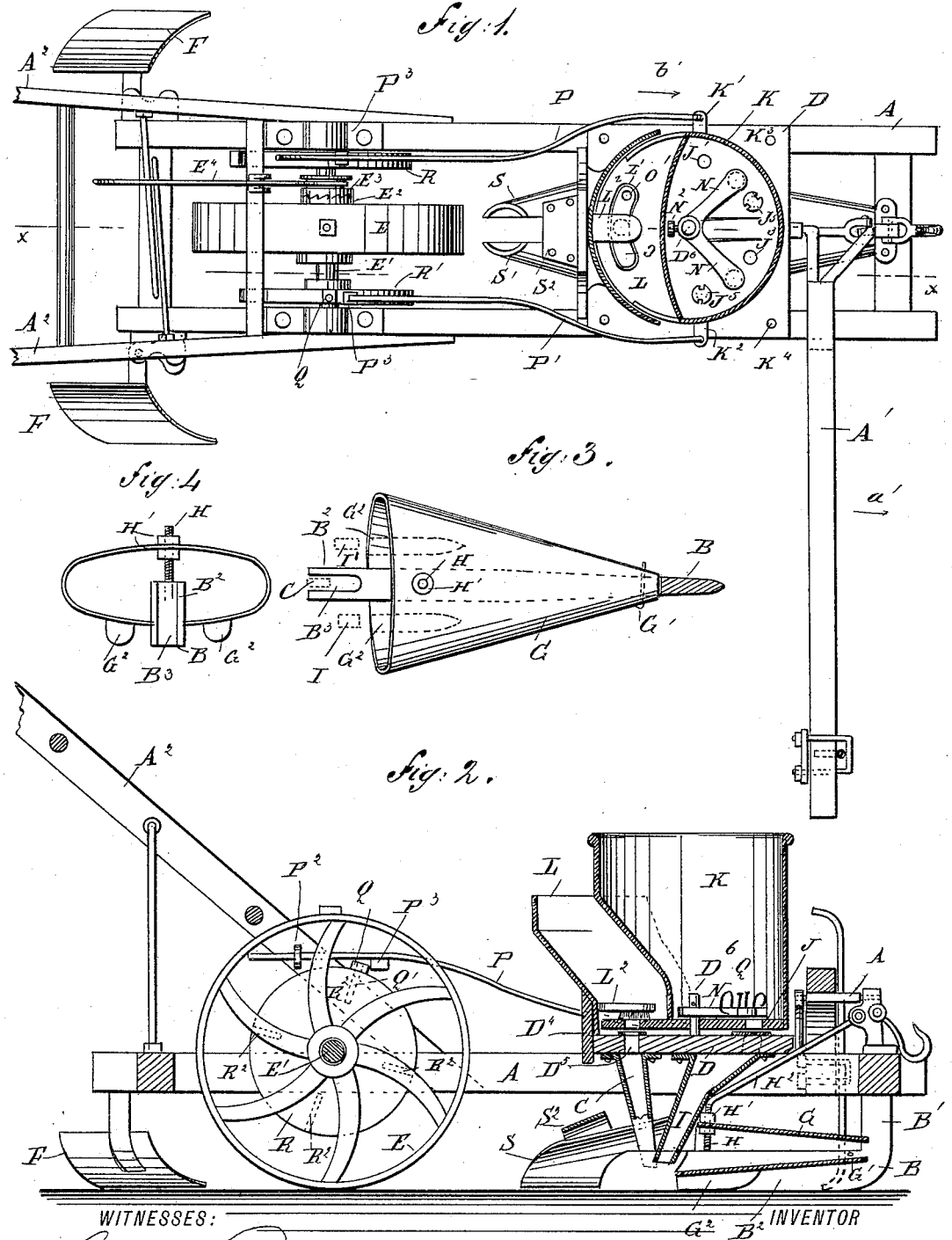
WITNESSES:
Chas. Nida
E. Sedgwick
INVENTOR
W. A. Holt
BY Munn & Co.
ATTORNEY (No Model.) 2 Sheets—Sheet 2.
W. A. HOLT.
SEED PLANTER AND FERTILIZER DISTRIBUTER.
No. 405,477. Patented June 18, 1889.
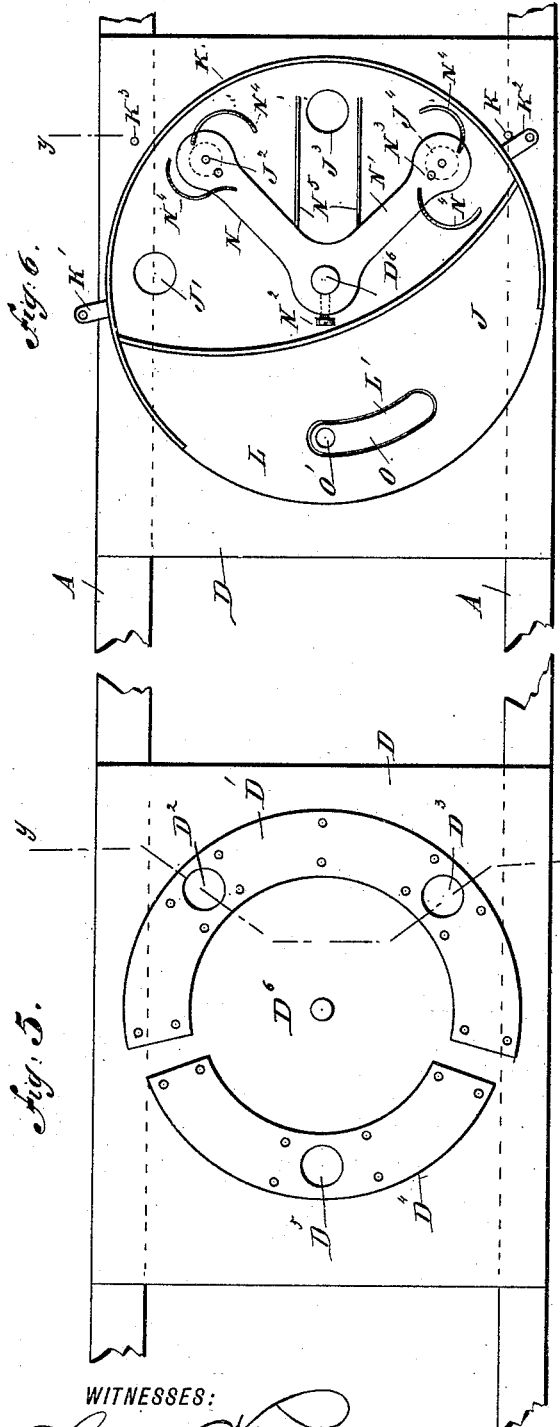
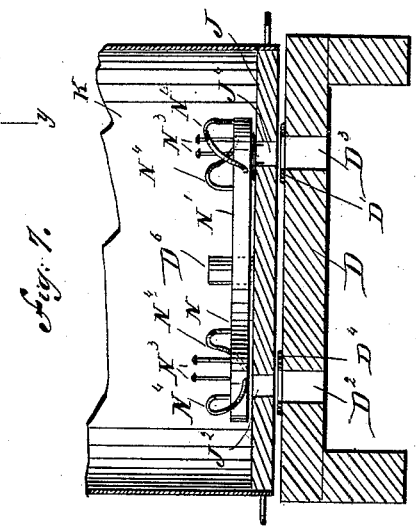
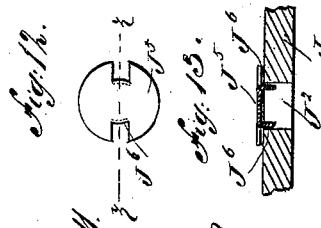
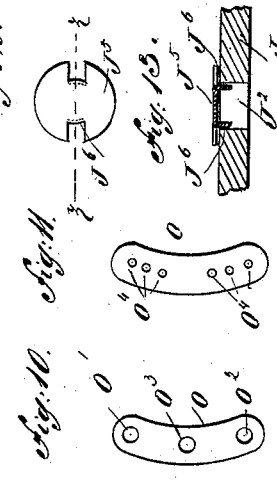
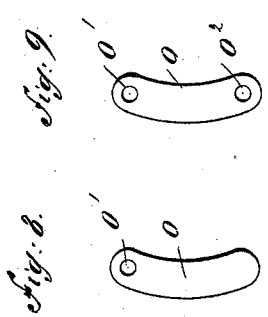
WITNESSES:
Chas. Nida
C. Sedgwick
INVENTOR
W. A. Holt
BY Munn & Co
ATTORNEY

UNITED STATES PATENT OFFICE.

WHITMON A. HOLT, OF HARRISON, MAINE.

SEED-PLANTER AND FERTILIZER-DISTRIBUTER.

SPECIFICATION forming part of Letters Patent No. 405,477, dated June 18, 1889.

Application filed November 6, 1888. Serial No. 290,105. (No model.)

*To all whom it may concern:*

Be it known that I, WHITMON A. HOLT, of Harrison, in the county of Cumberland and State of Maine, have invented a new and Improved Seed-Planter and Fertilizer-Distributer, of which the following is a full, clear, and exact description.

The object of the invention is to provide a new and improved planter specially adapted for planting corn and dropping fertilizer alongside of the corn, and being arranged for changing the distances between the several hills or drills.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a plan view of the improvement with parts in section. Fig. 2 is a sectional side elevation of the same on the line $x$ $x$ of Fig. 1. Fig. 3 is a plan view of the plow. Fig. 4 is an end view of the same. Fig. 5 is an enlarged plan view of the seed-box support. Fig. 6 is an enlarged plan view of the seed-box and its support. Fig. 7 is a transverse section of the same on the line $y$ $y$ of Figs. 5 and 6. Figs. 8, 9, 10, and 11 are plan views of interchangeable plates for the seed-box bottom. Fig. 12 is a plan view of the button for closing the aperture in the fertilizer-box bottom, and Fig. 13 is a sectional elevation of the same in position on the line $z$ $z$ of Fig. 12.

A suitably-constructed frame A is supported at its front end by a plow B, provided with a shank B', extending upward and secured to the front end of the main frame A. The plow B is provided with the rearwardly-extending beam $B^2$, having at its rear end a slot $B^3$, into which opens the seed-chute C, secured to the under side of a plate D, fastened on the top of the main frame A, as is plainly shown in Figs. 1 and 2.

The rear end of the main frame A is supported by a wheel E, held in line with the plow B and mounted to rotate loosely on a shaft E', turning in suitable bearings formed on the main frame A. The wheel E is provided with a hub $E^2$, having teeth engaging corresponding teeth formed on the clutch $E^3$, held to slide on and to turn with the said shaft E'. A lever $E^4$, fulcrumed on the main frame A, is connected with the said clutch $E^3$ for moving the latter in and out of contact with the hub $E^2$ of the wheel E.

At the extreme rear end of the main frame A are held the covering-shovels F F, of any approved construction. On the front end of the main frame A is held the usual sidewise-extending marker A', and on the rear end of the main frame A are secured the handles $A^2$ for guiding the entire machine. On the front end of the plow B is pivotally connected at G' a funnel-shaped casing G, provided on its under side with a slot, through which passes the part $B^2$ of the plow B. The casing G can be moved up and down at its rear end by a rod H, screwing in the part $B^2$ and passing through the upper part of the casing G, with the nuts H' screwing on the said rod H at the top and bottom of the said casing G, as is plainly shown in Fig. 2. The rod H continues into the angular part $H^2$, secured to the front end of the main frame A. When the nuts H H' are adjusted up or down on the rod H, the casing G is swung upward or downward at its rear end. On the under side and at the rear of the said casing G are held the two short plows $G^2$, which form furrows into which the fertilizer is dropped.

Spouts I and I' are secured to the under side of the plate D and open at their lower ends into the furrows formed by the plows $G^2$. The fertilizer drops through said spouts I and I' into the furrows formed by the said plows. On top of the plate D is secured the segmental guide-plate D', in which and in the plate D are formed the apertures $D^2$ and $D^3$ opening into the spouts I and I', before mentioned. A similar segmental bearing-plate $D^4$ is also fastened to the plate D, and both the plate D and plate $D^4$ are provided with an opening $D^5$, registering with the upper end of the chute C, leading to the slot $B^3$ of the plow-beam $B^2$.

In the center of the plate D is secured an upwardly-extending pin $D^6$, on which is mounted to turn the disk J, forming the bottom for the fertilizer-hopper K, and also for the seed-hopper L. The sides of the hopper L are formed by the back and projecting sides of the hopper K and a segmental plate secured to the frame and overlapping the projecting sides of the said hopper K. In the disk J and in the fertilizer-hopper K are formed the openings $J'$, $J^2$, $J^3$, and $J^4$, adapted to register alternately with the openings $D^2$ and $D^3$ in the plate D. The openings $J'$ $J^2$ and $J^3$ $J^4$ are alternately closed or opened by the fixed arms N and N', secured by a set-screw $N^2$ to the pin $D^6$. This opening and closing of the said apertures by the said arms N and N' take place when the disk J is turned or oscillated, and the said arms N and N' are provided with pins $N^3$ and curved arms $N^4$ for agitating the fertilizer stored in the box K when the latter, with the disk J, is turned on the pin $D^6$, as hereinafter more fully described. Rods $N^5$ project from the said arms N and N', and serve for a purpose similar to that of the pins and curved rods $N^3$ and $N^4$ above mentioned. In the disk J in the said hopper L is formed a segmental slot L', into which fit interchangeable plates O, illustrated in Figs. 8, 9, 10, and 11. Said plates O are provided with either one, two, three, or four apertures, as illustrated in the figures, and serve for dropping the corn in hills different distances apart, according to the nature of the seed used. In the seed-hopper L is secured a brush $L^2$, operating directly over the plate O.

On the outside of the hopper K are secured at opposite points the lugs K' and $K^2$, pivotally connected by the rods P and P', respectively, extending rearwardly and passing through fixed guides $P^2$, secured to the inside of the handles $A^2$. On the under side of each rod P and P' is formed a lug $P^3$, adapted to be engaged by a projection Q, secured on a pin Q', fastened into the rim of a wheel R or R', secured on the shaft E in any suitable manner. Any number of such projections Q may be placed on the rim of the wheel R or R', the openings $R^2$ for the pins Q' being arranged equal distances from each other.

At the rear of the plow B are held the curved covering-shovels S and S', connected with each other at their tops by a plate $S^2$. One or two of the openings $J'$, $J^2$, $J^3$, and $J^4$ may be closed by a button $J^5$, (illustrated in Figs. 12 and 13,) said button being formed of thin sheet metal with two downwardly-extending prongs $J^6$ fitting into the respective openings before mentioned.

The operation is as follows: When the machine is moved forward in the direction of the arrow a', the plow B forms a furrow under the center of the machine, and two similar furrows are formed alongside the central one by the action of the plows $G^2$. When the operator throws the clutch $E^3$ into contact with the hub $E^2$ of the wheel E, the latter rotates the shaft E' on the forward movement of the machine, so that the wheels R and R' are rotated and impart a forward motion to the rods P and P', which by their connection with the lugs K' and $K^2$ oscillate the hoppers L and K with the disk J on the pin $D^6$ of the plate D. When the lug Q on the wheel R strikes the projection $P^3$ on the rod P, the hoppers L and K are oscillated in the direction of the arrow b', and when the projection Q strikes the lug $P^3$ on the rod P' the said hoppers L and K are turned in the inverse direction of the arrow b'—that is to say, the hoppers will be oscillated as the planter is drawn forward. This oscillating of the hoppers L and K on the disk J brings the opening O' in the plate O over the aperture $D^5$, leading to the chute C, so that the corn which has dropped into the said opening O' is delivered through the opening $D^5$ and the chute C into the slot $B^3$ at the end of the plow-beam $B^2$. The brush $L^2$, held over the said opening O' when the latter registers with the opening $D^5$, prevents more seed from dropping through the opening O'. The oscillating of the disk J with the hoppers K and L causes the uncovering of the respective apertures $J'$ $J^2$ and $J^3$ $J^4$ by the arms N and N', so that fertilizer can pass into the said apertures J J' when uncovered, and be moved under the arms N and N', so as to register with the apertures $D^2$ and $D^3$, formed in the plate D. The fertilizer thus passes into the aperture $J'$, $J^2$, $J^3$, or $J^4$ and drops through the respective openings $D^2$ or $D^3$ into the respective chute I or I', which deliver the fertilizer to the furrows made by the plows $G^2$. Thus the seed is dropped into the central furrow and the fertilizer is dropped alongside the seed at both sides into the furrows made close to the central furrow containing the seed. The covering-shovels S cover up the several furrows, and the wheel E, which is in line with the plow B, rolls the closed furrow. The plows F at the rear end of the frame A serve to hill in the usual manner.

When the operator uses the plate O shown in Fig. 8 the hills are placed a considerable distance apart, equal to one-half of the circumference of the wheel E. When the operator uses the plate illustrated in Fig. 9, the two apertures O' and $O^2$ register alternately with the opening $D^5$ in the plate D, so that the hills are placed one-half of the distance apart left when the plate O shown in Fig. 8 is used. The distances between the hills may be further decreased by using the plate shown in Fig. 10, which is provided with three openings O', $O^2$, and $O^3$, registering alternately with the said opening $D^5$. The plate shown in Fig. 11 is provided with two sets of openings on each side, and serves to drop seed very quickly. The arrangement thus described is used when the wheels R and R' are each provided in their periphery with only one projection Q; but if two projections Q, placed diametrically opposite each other on each wheel R and R', are used the distance between the several hills, as above described, is reduced one-half, as the said two projections Q act twice on each lug $P^3$ of the rods P and P' for one revolution of the wheel R or R'. If four projections Q are used on each wheel R and R', the hoppers L and K and the disk J are oscillated very rapidly, as the said projections Q act four times on each lug P³ of the rods P and P' during every revolution of the said wheel R or R'.

Having thus described my invention, what I claim as new, and desire to secure by Letters Patent, is—

1. In a planter, the combination, with a frame, of a central plow held on the said frame, side plows held parallel on the said central plow, chutes opening on the rear ends of the said plows, a plate secured to the main frame and supporting said chutes, a disk held to oscillate on the said fixed plate and having openings registering with openings in the said fixed plate, and a fertilizer and a seed-hopper held on the said disk, substantially as shown and described.

2. In a planter, the combination, with a frame, three plows, and a main wheel, of a disk supporting the seed and the fertilizer-hoppers and mounted to oscillate, being operated from the said main wheel, a fixed plate held on the said frame and having openings adapted to register with the openings in the said disk, and chutes held on the under side of the said fixed plate and leading to furrows made by the said plows, substantially as shown and described.

3. In a planter, the combination, with a fixed plate having openings, of a disk mounted to oscillate on the said plate and provided with openings adapted to register with the openings in the fixed plate, a hopper carried by the oscillating disk, and fixed arms secured to the pivot of the oscillating plate, substantially as described.

4. In a planter, the combination, with a fixed and apertured plate, of oscillating disk above the plate and provided with openings adapted to register with the openings of the fixed plate, a hopper carried by the oscillating disk, and fixed arms secured to the pivot of the said oscillating disk and provided with rods projecting therefrom, substantially as and for the purpose set forth.

5. In a planter, the combination, with a fixed plate having openings, of a disk held to oscillate on the said plate and having openings adapted to register with the openings in the said plate, a fertilizer-hopper secured on the said disk, and fixed arms held on the said hopper in line with the openings in the said fixed plate, rods secured to the said arms to agitate the fertilizer in the said fertilizer-hopper, and buttons adapted to close one or more of the said openings in the said disk, substantially as shown and described.

6. In a planter, the combination, with a frame and a plate secured to the said frame and having openings, of a disk mounted to oscillate on the said fixed plate and having openings adapted to register with the openings in the said fixed plate, a seed-hopper and a fertilizer-hopper secured on the said disk, rods connected with the said disk and provided with lugs, wheels provided with lugs adapted to engage the lugs on the said rods, a shaft carrying the said wheels and mounted on the said main frame, and a wheel held on the said shaft for rotating the latter on the forward movement of the machine, substantially as shown and described.

7. In a planter, the combination, with a frame and a plate secured to the said frame and having openings, of a disk mounted to oscillate on the said fixed plate and having openings adapted to register with the openings in the said fixed plate, a seed-hopper and a fertilizer-hopper secured on the said disk, rods connected with the said disk and provided with lugs, wheels provided with lugs adapted to engage the lugs on the said rods, a shaft carrying the said wheels and mounted on the said main frame, a wheel held on the said shaft for rotating the latter on the forward movement of the machine, and a clutch mechanism for connecting or disconnecting said main wheel with or from the said shaft, substantially as shown and described.

8. In a planter, the combination, with a fixed plate having an aperture, of a disk held to oscillate on the said plate and having a segmental slot, a plate fitting into the said segmental slot and having one or more apertures adapted to register with the openings in the said disk, a seed-hopper secured on the said disk around the said segmental slot, and a brush secured in the said seed-hopper and held directly above the opening in the said fixed plate, substantially as shown and described.

9. In a planter, the combination, with a frame, of a wheel supporting the rear end of the said frame, a plow supporting the front end of the said frame, and a casing mounted to swing on the said plow, substantially as shown and described.

10. In a planter, the combination, with a frame, of a wheel supporting the rear end of the said frame, a plow supporting the front end of the said frame, a casing mounted to swing on the said plow, two plows held on the under side of the said casing parallel with the said central plow, and means for raising and lowering said casing, substantially as shown and described.

WHITMON A. HOLT.

Witnesses:
JOHN W. CASWELL,
A. H. WALKER.